(12) United States Patent
Burton

(10) Patent No.: US 9,574,030 B1
(45) Date of Patent: Feb. 21, 2017

(54) PROCESS FOR THE POLYMERIZATION OF ALPHA OLEFINS AND NON-CONJUGATED DIENES USING A TOLUENE FREE HOMOGENOUS CO-CATALYST SYSTEM WITH METALLOCENE PRO-CATALYSTS

(71) Applicant: LION COPOLYMER GEISMAR, LLC, Geismar, LA (US)

(72) Inventor: Willie Charles Burton, Geismar, LA (US)

(73) Assignee: LION COPOLYMER GEISMAR, LLC, Geismar, LA (US)

(*) Notice: Subject to any disclaimer, the term of this patent is extended or adjusted under 35 U.S.C. 154(b) by 0 days.

(21) Appl. No.: 15/247,630

(22) Filed: Aug. 25, 2016

Related U.S. Application Data

(63) Continuation-in-part of application No. 14/081,937, filed on Nov. 15, 2013.

(60) Provisional application No. 61/728,607, filed on Nov. 20, 2012.

(51) Int. Cl.
| | |
|---|---|
| *C08F 4/6592* | (2006.01) |
| *C08F 4/642* | (2006.01) |
| *C08F 4/643* | (2006.01) |
| *C08F 210/16* | (2006.01) |
| *C08F 210/06* | (2006.01) |
| *C08F 210/02* | (2006.01) |
| *C08F 4/659* | (2006.01) |

(52) U.S. Cl.
CPC .......... *C08F 210/06* (2013.01); *C08F 4/6592* (2013.01); *C08F 4/65908* (2013.01); *C08F 4/65912* (2013.01); *C08F 210/02* (2013.01); *C08F 210/16* (2013.01)

(58) Field of Classification Search
CPC . C08F 4/6592; C08F 4/65908; C08F 4/65912; C08F 210/16
See application file for complete search history.

(56) References Cited

U.S. PATENT DOCUMENTS

| | | |
|---|---|---|
| 6,225,427 B1 | 5/2001 | Burton et al. |
| 6,696,379 B1 | 2/2004 | Carnahan et al. |
| 2005/0209417 A1 | 9/2005 | Marks et al. |

*Primary Examiner* — Caixia Lu
(74) *Attorney, Agent, or Firm* — Buskop Law Group, PC; Wendy Buskop

(57) ABSTRACT

A homogenous toluene free catalyst system for producing a polyolefin elastomer possessing a unique combination of properties employing a particular type of a metallocene catalyst. The homogenous toluene free catalyst system having a co-catalyst for activating the metallocene pro-catalyst employing a specific molar ratio of the components of the co-catalyst blend to the metal of the pro-catalyst.

20 Claims, 1 Drawing Sheet

| Example | Pro-catalyst | E/P Ratio Wt Ratio | Mw Daltons | Mw/Mn | ML 125 °C | Diene Wt% | Tg °C | Product |
|---|---|---|---|---|---|---|---|---|
| 9 | 1 | 77/23 | 141156 | 1.8 | 72 | 0 | -40 | EP |
| 10 | 1 | 77/23 | 424000 | 1.8 | 126 | 0 | -40 | EP |
| 11 | 1 | 64/36 | 428815 | 1.8 | 126.4 | 0 | -55 | EP |
| 12 | 1 | 68/32 | 142590 | 1.9 | 79.8 | 2.13 | -52 | EPDM |
| 13 | 1 | 69/31 | 350000 | 2.1 | 119.3 | 3.7 | -53 | EPDM |
| 14 | 1 | 71/29 | 520800 | 1.9 | 134 | 2.3 | -45 | EPDM |
| 15 | 1 | 71/29 | 646357 | 2.1 | 142.9 | 3.8 | -50 | EPDM |
| 16 | 1 | 67/33 | 216273 | 2 | 101.5 | 2.6 | -50 | EPDM |
| 17 | 1 | 54/46 | 120578 | 1.8 | 28 | 0 | -57 | EP |
| 18 | 2 | 48/52 | 50021 | 2.8 | 10 | 0 | -60 | EP |
| 19 | 2 | 53/47 | 61398 | 2.5 | 10 | 2.5 | -55 | EPDM |
| 20 | 2 | 70/30 | 79730 | 2.7 | 10 | 7.3 | -43 | EPDM |

Pro-catalyst 1 = Diphenylsilyl(cyclopentadienyl, 9-fluorenyl) zirconium dichloride
Pro-catalyst 2 = Ethylenebis(indenyl) zirconium dichloride

PROCESS FOR THE POLYMERIZATION OF ALPHA OLEFINS AND NON-CONJUGATED DIENES USING A TOLUENE FREE HOMOGENOUS CO-CATALYST SYSTEM WITH METALLOCENE PRO-CATALYSTS

CROSS REFERENCE TO RELATED APPLICATION

The present application is a Continuation in Part of co-pending U.S. patent application Ser. No. 14/081,937 filed on Nov. 15, 2013, entitled "PROCESS FOR THE POLYMERIZATION OF ALPHA OLEFINS AND NON-CONJUGATED DIENES USING A TOLUENE FREE HOMOGENOUS CO-CATALYST SYSTEM WITH METALLOCENE PRO-CATALYSTS", which claims priority to and the benefit of U.S. Provisional Patent Application Ser. No. 61/728,607 filed on Nov. 20, 2012, entitled "PROCESS FOR THE POLYMERIZATION OF ALPHA OLEFINS AND NON-CONJUGATED DIENES USING A TOLUENE FREE HOMOGENOUS CO-CATALYST SYSTEM WITH METALLOCENE PRO-CATALYSTS." These references are hereby incorporated in their entirety.

FIELD

The present embodiments generally relate to a metallocene catalyst system that is toluene free and usable for polymerizing alpha olefin and non-conjugated diene monomers into polymeric elastomers.

BACKGROUND

A need exists for a homogenous toluene free catalyst system for producing a polyolefin elastomer possessing a unique combination of properties employing a particular type of a metallocene catalyst. Also disclosed is a co-catalyst for activating the metallocene pro-catalyst employing a specific molar ratio of the components of the co-catalyst to the transition metal of the pro-catalyst. The present embodiments meet these needs.

BRIEF DESCRIPTION OF THE DRAWINGS

The detailed description will be better understood in conjunction with the accompanying drawing as follows:

FIG. 1 depicts a list of EP and EPDM polymers prepared with the use of this toluene-free catalyst according to one or more embodiments.

The present embodiments are detailed below with reference to the listed FIGURE.

DETAILED DESCRIPTION OF THE EMBODIMENTS

Before explaining the present process in detail, it is to be understood that the process is not limited to the particular embodiments and that it can be practiced or carried out in various ways.

The present embodiments relate to a homogenous toluene free catalyst system for producing a polyolefin elastomer possessing a unique combination of properties employing a particular type of a metallocene catalyst.

The present embodiments also relate to a co-catalyst for activating the metallocene pro-catalyst employing a specific molar ratio of the components of the co-catalyst to the transition metal of the pro-catalyst.

The term "catalytically effective homogenous solution" as used herein can refer to a mixture of metallocene complex and co-catalyst compounds dissolved in a medium with no obvious suspended or settleable solids.

The term "alpha olefin" as used herein can refer to any linear or branched alkene, which has a double bond between the first and second carbon atoms.

The term "co-catalyst blend" as used herein can refer to a mixture or solution of compounds capable of reacting with a metallocene pro-catalyst to form an ion pair.

The term "M-R3" as used herein can refer to trialkyl metal or metalloid compound such as triisobutylaluminum or triethylaluminum.

The term "metallocene pro-catalyst" as used herein can refer to any metallocene complex capable of reacting with another compound (co-catalyst) to form an ion pair that is efficient in initiating polymerization of alkenes.

The term "modified methylaluminoxane (MMAO)" as used herein can refer to methylaluminoxane in which a portion of the methyl groups has been replaced by longer chain aliphatic hydrocarbyl groups such as butyl or octyl.

The term "toluene free aliphatic hydrocarbon catalyst mixture" as used herein can refer to any catalyst solution or mixture in which the toluene solvent has been replaced by a non-aromatic medium such as hexane or heptane.

In order to achieve optimum performance, many catalyst systems require a high level of dissolution. Due to the ionic and/or aromatic character of many metallocene pro-catalysts, aromatic solvents, such as toluene are required to achieve solvation.

Because of the undesirable hazards associated with aromatic solvents, toluene is not the solvent of choice for industrial applications of these catalysts.

This invention allows the use of toluene-free metallocene catalyst systems in the presence of ethylene-propylene diene monomer elastomers hereafter termed "EPDM" elastomers.

This invention relates to a process for the polymerization of olefins employing a metallocene catalyst and to a co-catalyst for activating a metallocene pro-catalyst to provide the metallocene catalyst.

The most common polyolefin elastomers produced today are copolymers of ethylene and propylene (EP) and terpolymers of ethylene, propylene and a non-conjugated diene (EPDM) henceforth referred to as diene. Ordinary EP elastomers can be cured using such curatives as organic peroxides, while the use of sulfur as a curative requires the incorporation of a diene. EPDM elastomers are usually produced with vanadium-organoaluminum catalysts, i.e., Ziegler-Natta catalysts.

Along with the better known EP and EPDM polymers, co- and terpolymers incorporating other .alpha.-olefins in place of propylene such as 1-butene, 1-pentene, 1-hexene, styrene, and combinations thereof are also known. EPDMs are representative of the more general category of ethylene-.alpha.-olefin diene elastomers (EODEs). Of the EODEs, EPDMs have achieved particular prominence due to the many properties which make them desirable for applications requiring good weather and acid resistance and high and low temperature performance. Notable applications of the EPDMs include their use in such products as hoses, gaskets, power transmission belts, conveyor belts, bumpers, automotive extrusions and moldings, weather stripping, blending components for plastics and rubbers such as polypropylene, polystyrene and butyl rubber, fabric coatings, viscosity modifiers for lubrication oils, tire sidewalls and in roofing and other membrane applications, shoe soles and heels and many other rubber articles. Another noteworthy application of the EPDMs is in wire and cable insulation due to their excellent dielectric properties.

It is desirable for an EPDM to have a reasonably fast cure rate and high state of cure, requirements calling for a relatively high diene content, e.g., three percent or higher. The cure rate for an EPDM elastomer and the final properties of the cured article depend upon the type of diene incorporated. For example, on a comparable diene weight percent basis, an EPDM produced with 5-ethylidiene-2-norbornene (ENB) as the diene will have a faster cure rate using a sulfur cure than would an EPDM containing dicyclopentadiene (DCPD) or 1,4-hexadiene (HD).

As for the properties of cured EPDM, EPDMs made with hexadiene as the termonomer are known to exhibit good heat resistance. For most commercial elastomer applications, the EPDM should have a weight-average molecular weight ($M_w$) ranging from 250,000, to 1,000,000 or Mooney Viscosity $(ML)_{1+4}$ at 125 degrees Celsius ranging from 20 to 150 when expressed in terms of Mooney viscosity. In many applications, it is further desirable that the molecular weight distribution (MWD) of an EPDM be characterized by a ratio of weight average molecular weight to number average molecular weight ($M_w/M_n$), i.e., polydispersity index, of not greater than 10 and preferably not greater than 7.

The properties of an EPDM elastomer such as its tensile strength, processability and tack can be related to its degree of crystallinity. Since in most commercial uses elastomers are higher in molecular weight than plastics, too high a degree of crystallinity can make an EPDM difficult to process at ordinary temperatures. Although good physical properties are desirable, especially in such applications as hose, tubing, wire and cable, excessive crystallinity can cause an EPDM to exhibit high hardness and stiffness resulting in a "plastic" rather than a "rubber" surface with poor surface tack.

In general, commercially useful plastics, which are homo- and copolymers of ethylene, propylene, and higher $\alpha$-olefins, need not have as high a molecular weight as commercially useful elastomers of ethylene-$\alpha$-olefins such as EPDM. In terms of the catalysts used for each, when producing copolymers with compositions of $M_w$ in the elastomer range, catalysts that provide high $M_w$ plastic copolymers may produce low $M_w$ polymers unsuitable for elastomer applications. Similarly, undesirable MWD changes can occur or the compositional distribution can change. Thus, catalyst performance for the production of plastics is not indicative of catalyst performance for the production of elastomers.

In current commercial grades of EPDM, crystallinity is a function of both the ethylene content of the polymer and the catalyst system used for its production. For a given polymer composition, the catalyst system controls the fraction of ethylene units present in long ethylene sequences which are capable of crystallizing. With any given catalyst and reactor configuration, polymers with higher ethylene content will have longer ethylene sequences and be more crystalline.

In current EPDM production based on vanadium catalysts, the product EPDM polymers are completely amorphous (non-crystalline) at ethylene contents below 55 weight percent. Conversely, at ethylene contents of 55 weight percent or greater, an EPDM will possess significant crystallinity. The degree of crystallinity depends less on the diene content of the EPDM than on the percentage of ethylene.

In order for the catalyst system to be useful for the commercial production of an EPDM elastomer, it is desirable for the crystallinity of the polymer to be roughly comparable to that of currently available commercial grades of EPDM for most applications.

Metallocene catalysts typically consist of a transition-metal atom sandwiched between cyclopentadienyl or substituted cyclopentadienyl ring structures to form a stable complex. Depending on the substituents on the cyclopentadienyl rings (or bridging atoms if present), many of these complexes show little or no solubility in aliphatic hydrocarbons, thus requiring the use of aromatic solvents such as toluene. Because of toxicity concerns, aromatic solvents are undesirable for EPDM production processes; aliphatic solvents are the preferred reaction medium.

Metallocene catalysts cost significantly more than the traditional Ziegler-Natta catalysts but the metallocene systems are considerably more productive. In some cases, the increased productivity of metallocene catalysts relative to the Ziegler-Natta catalysts ranges from one to two orders of magnitude more polymers produced per pound of catalyst. In actual practice, the extent to which metallocene catalysts can effectively replace traditional catalysts in EPDM production depends in part on their solubility, which directly impacts catalyst efficiency and subsequently the catalyst cost per pound of product.

The polymerization process herein employs a catalyst composition obtained by activating a metallocene pro-catalyst with a suitable co-catalyst in an aliphatic hydrocarbon solvent.

The metallocene pro-catalyst can be one or a mixture of metallocene compounds in which the metallocene compound possesses a transition metal. Representatives of the metallocene compounds are well known in the art, the contents of which are incorporated by reference herein. Illustrative of suitable metallocene pro-catalysts for use herein include zirconocene dichloride, dimethylbis(indenyl) zirconium, racemic-ethylenebis(indenyl) zirconium dichloride, dimethylsilyl bis(cyclopentadienyl) zirconium dichloride, dimethylsilyl(tetramethylcyclo-pentadienyl)(tert-butylamido) titanium dichloride, diphenylmethylene (cyclopentadienyl-9-fluorenyl)zirconium dichloride, diphenylsilyl(cyclopenta-dienyl-9-fluorenyl) zirconium dichloride and the like. Useful transition metals include titanium, zirconium, hafnium and the like.

Methods for preparing these and other useful metallocene pro-catalysts are known in the art and do not constitute a part of the present invention.

To perform as polymerization catalysts, metallocene pro-catalysts require co-catalysts in specific ratios to the transition metal component of the metallocene complex to generate the toluene free metallocene catalyst system.

The co-catalyst of the composition described below is used to activate the metallocene pro-catalyst. In general, the co-catalyst used herein can be, as a first component, at least one organometallic or organometalloid compound containing at least one compound of the general formula:

wherein R is a hydrocarbyl group of from 1 to 30 carbon atoms and preferably from 1 to 20; and a second component, a neutral or ionic metal- and/or metalloid-containing compound having at least one aryl group possessing at least one electron withdrawing substituent.

Suitable first components for providing the co-catalyst used herein include alkylaluminum alkoxides such as diisobutylaluminum-tert-butoxide; siloxanes such as diethylaluminum trimethylsiloxane; dimeric aluminoxanes such as tetraisobutylaluminoxane and oligomeric aluminoxanes such as methylaluminoxane and alkyl modified versions of methylaluminoxane commonly referred to as modified methylaluminoxanes (MMAO). Of the foregoing first components, modified methylaluminoxane is preferred because of its solubility in aliphatic hydrocarbons.

Suitable second components for providing the co-catalyst used herein include perfluoroarylboranes such as tris (pentafluorophenyl)borane and salts of perfluoroarylborates such as dimethylanilinium tetrakis (pentafluorophenyl)borate, trityl tetrakis (pentafluorophenyl)borate, lithium tetrakis (pentafluorophenyl)borate and the like. Of the foregoing second components tris (pentafluorophenyl)borane is preferred.

Optionally, at least one trialkylaluminum compound can be employed as a third component when activating the pro-catalyst to advantageously remove polar impurities, thus preventing deactivation of the catalyst during the polymerization process. Suitable trialkylaluminum compounds include trimethylaluminum, triethylaluminum, tri(n-propyl) aluminum, triisopropyl-aluminum, tri(n-butyl)aluminum, triisobutylaluminum, tri(n-hexyl)aluminum, tri(n-octyl)aluminum, and the like. Of the foregoing trialkylaluminum compounds, triisobutylaluminum is preferred. In general, the optional trialkylaluminum can be utilized in a molar ratio of trialkylaluminum to metallocene pro-catalyst, expressed in terms of its transition metal, ranging from 0.1 to 1,000.

Activation of the metallocene pro-catalyst can be achieved by combining the metallocene pro-catalyst with the aforementioned components of the co-catalyst either simultaneously or in any sequence either within or in the absence of, the olefin monomer and with any interval of time there between. Activation of the pro-catalyst can also be achieved by, for example, reacting the metallocene with the first component of the co-catalyst and thereafter combining the product of this reaction with a solution of the second component in an inert solvent, e.g., hexane, and the optional third component either simultaneously or sequentially either within, or in the absence of, the olefin monomer.

It is particularly advantageous to activate the metallocene pro-catalyst by reacting the first component of the co-catalyst with the second component of the co-catalyst and thereafter combining the product of this reaction with the metallocene pro-catalyst sequentially in the presence of an inert solvent such as hexane and in the absence of the olefin monomer.

Activation of the metallocene pro-catalyst outside the polymerization reactor in the absence of monomer is preferred, and is advantageously conducted at ambient temperature for a period ranging from 1 minute to 60 minutes. In general, the molar ratio of the first component of the co-catalyst to metallocene pro-catalyst, expressed in terms of its transition metal, can vary from 1 to 10,000, preferably from 5 to 2000, and more preferably from 10 to 1000, and the molar ratio of the second component of the co-catalyst to metallocene pro-catalyst, expressed in terms of its transition metal, can vary from 0.01 to 14, preferably from 0.1 to 12 and more preferably from 0.2 to 10.

The .alpha.-olefins suitable for use in the preparation of the elastomers herein contain from 2 to 20 carbon atoms and include ethylene, propylene, 1-butene, 3-methylbutene, 1-pentene, 4-methyl-1-pentene, 1-hexene, 1-octene, 1-decene, 1-dodecene, and vinyl aromatic monomers such as styrene, .alpha.-methyl styrene and the like. Of the foregoing .alpha.-olefins, ethylene and propylene are preferred.

The optional diene monomer(s) can be conjugated or nonconjugated. Conjugated monomers include butadiene, isoprene, 2,3-dimethylbutadiene and cyclopentadiene.

Examples of suitable non-conjugated dienes include straight chain acyclic dienes such as 1,4-hexadiene, 1,5-hexadiene, 1,6-heptadiene, and, 1,7-octadiene; branched chain acyclic dienes such as 4-methyl-1,5-hexadiene, 5-methyl-1,4-hexadiene, 3,7-dimethyl-1,6-octadiene, 3-7-dimethyl-1,7-octadiene and mixed isomers of dihydromyrcene and dihydroocimene; unsubstituted and substituted cyclic dienes such as 1,4-cyclohexadiene, 1,5-cyclooctadiene and 1,5-cyclododecadiene; and, multicyclic dienes such as tetrahydroindene, methyltetrahydroindene, dicyclopentadiene; bicyclo-(2,2,1)-hepta-2,6-diene; alkenyl, alkylidene, cycloalkenyl and cycloalkylidene norbornenes such as 5-methylene-2-norbornene, 5-ethylidene-2-norbornene, 5-propenyl-2-norbornene, 5-isopropylidene-2-norbornene, 5-butenyl-2-norbornene, 5-(4-cyclopentenyl)-2-norbornene, 5-cyclohexylidene-2-norbornene, 5-vinyl-2-norbornene and norbornadiene. Of the foregoing dienes used to prepare, for example, EODEs, can be 1,4-hexadiene, 5-ethylidene-2-norbornene, 5-vinylidene-2-norbornene, 5-methylene-2-norbornene and dicyclopentadiene and of these, 5-ethylidene-2-norbornene, 5-vinylidene-2-norbornene and dicyclopentadiene are preferred.

The elastomeric .alpha.-olefin copolymers and EODEs can contain, e.g., in the case of an ethylene-propylene copolymer, up to 90 weight percent ethylene, and from 10 weight percent to 70 weight percent propylene, the balance being the optional diene monomer(s). The diene monomer(s), when utilized, can be incorporated into the .alpha.-olefin copolymer at a level of from 0.1 weight percent to 30 weight percent.

Polymerization or copolymerization of the aforementioned monomers using the catalyst of the present invention can be carried out in any known manner, e.g., in a solution, suspension or slurry process, either continuously or in batch.

A typical batch solution polymerization process can be carried out by first introducing the hydrocarbon solvent, e.g., hexane, into a stirred tank reactor. The monomer feed comprising, e.g., ethylene, propylene, and diene(s) (if utilized) are then introduced into the liquid phase by way of a dip tube. A hydrocarbon solution of the catalyst in the required amount is then added to the liquid phase in the reactor. The rate of polymerization is controlled by the concentration of the catalyst. The reactor temperature is controlled by means of cooling coils, etc., and the initial total pressure in the reactor is maintained by a constant flow of gaseous monomer(s). By maintaining a faster rate of flow of gas(es) through the reactor than the rate of polymerization, the conditions in the reactor will approximate steady state conditions. The ethylene content of the elastomer product is determined by the metallocene catalyst used and by the ratio of ethylene to propylene in the reactor which is controlled by manipulating the relative feed rates of these monomers to the reactor. After polymerization and deactivation of the catalyst followed by coagulation of the elastomer, the latter can be recovered by any suitable means and further processed as desired.

In a slurry polymerization process, a suspension of the solid, particulate polymer is formed in the hydrocarbon diluent to which the .alpha.-olefin(s), any optional diene(s) and the catalyst composition have been added. Slurry polymerization proceeds much like solution polymerization.

Polyolefin elastomers that can be obtained by the polymerization process herein possess a unique combination of high molecular weight ($M_w$), high Mooney viscosity ($ML_{1+4}$) low polydispersity index ($M_w/M_n$) and low glass transition temperature ($T_g$) properties that distinguish them from known polyolefin elastomers. The novel polyolefin elastomers of this invention prior to curing possess a $M_w$ from 70,000 to 2,000,000, a $ML_{1+4}$ at 125 degrees Celsius ranging from 10 to 200, a $M_w/M_n$ of 1.5 to 10, and a $T_g$ (degrees Celsuis) of below about −25.

EXAMPLE 1

To a 50 mL reaction flask combine 0.02 gram (0.039 mmole) of tris(pentafluorophenyl) borane and 10 mL of 1.5 molar (15 mmoles) of modified methylaluminoxane (MMAO) in isohexanes, yielding a co-catalyst blend.

The mixture is stirred at room temperature, 25 degrees Celsius, for 10 minutes, yielding a near homogeneous solution.

A metallocene compound, diphenylsilyl(cyclopentadienyl, 9-fluorenyl) zirconium dichloride 0.02 gram (0.035 mmole) was added to the co-catalyst blend, forming a polymerization catalyst system.

The catalyst system, 1.0 mL (0.002 gram of metallocene) was added to a stirred batch reactor containing hexane (1800 mL) and 2.5 mL of 1.0 Molar triisobutyl aluminum (in hexane) at 50 degrees Celsius and pressurized to 50 psig with a 1:1 mixture of ethylene and propylene, to yield ethylene/propylene elastomer copolymer.

EXAMPLE 2

2.5 mL of 1.0 molar triisobutylaluminum (TIBA) was added to a stirred 3.0 liter reactor, containing 1800 mL of hexanes at 55 degrees Celsius, in hexane, to serve as an impurities scavenger.

The reactor was charged with a 1:1 weight ratio of ethylene and propylene monomers to give an initial weight (pre-charge) of 19.8 grams of ethylene and 20.1 grams of propylene resulting in a reactor pressure of 50 psig. In other embodiments, the TIBA can be added after charging the reactor with the ethylene and propylene monomers.

Polymerization was initiated by introducing 2.0 mL of a toluene based catalyst solution consisting of the metallocene compound diphenylsilyl(cyclopentadienyl, 9-fluorenyl) zirconium dichloride (0.02 g), a boron salt N,N-dimethylaniliniumtetrakis(pentafluorophenyl) borate (0.028 g), and methylaluminoxane (MAO 1.5 M in toluene); after dilution to 10 mL with toluene, the catalyst solution having a zirconium:boron:aluminum ratio of 1:1:500); the metallocene compound concentration was 2.0 milligrams per milliliter. The ethylene and propylene monomers were continuously replenished as the reaction progressed for a total of 15 minutes. The reaction produced 84.2 grams of ethylene/propylene copolymer for a yield of 21,050 grams of polymer per gram of metallocene compound.

EXAMPLE 3

2.5 mL of 1.0 molar triisobutylaluminum (TIBA) in hexane was added to a 3-liter stirred reactor, containing 1800 mL of hexane at 57 degrees Celsius, to serve as an impurities scavenger.

The reactor was charged with a 1:1 weight ratio of ethylene (21.4 grams) and propylene (21.5 grams) resulting in a reactor pressure of 50 psig.

Polymerization was initiated by introducing 2.0 mL of a toluene-free catalyst solution (from Example 1) consisting of the metallocene compound diphenylsilyl(cyclopentadienyl, 9-fluorenyl) zirconium dichloride, a boron compound tris(pentafluorophenyl) borane, and modified methylaluminoxane (MMAO-C4) in isohexanes supplied by Albemarle Corporation. The catalyst had a zirconium:boron:aluminum ratio of 1:1:500. The metallocene compound concentration was 2.0 milligrams per milliliter. The ethylene and propylene monomers were continuously replenished at 50 psig as the reaction progressed. The polymerization was allowed to continue for 15 minutes, resulting in 102.3 grams of ethylene/propylene copolymer, giving a yield of 25,573 grams of polymer per gram of metallocene catalyst.

EXAMPLE 4

2.5 mL of 1.0 molar triisobutylaluminum (TIBA) in hexane was added to a stirred 3.0 liter reactor, containing 1800 mL of hexanes at 55 degrees Celsius, to serve as an impurities scavenger.

The reactor was charged with a 1:1 weight ratio of ethylene and propylene monomers to give an initial weight (pre-charge) of 20.2 grams of ethylene and 20.1 grams of propylene resulting in a reactor pressure of 50 psig. In other embodiments, the TIBA can be added after charging the reactor with the ethylene and propylene monomers.

Polymerization was initiated by introducing 1.0 mL of a toluene based catalyst solution consisting of a metallocene compound diphenylsilyl(cyclopentadienyl, 9-fluorenyl) zirconium dichloride, a borate salt N,N-dimethylaniliniumtetrakis(pentafluorophenyl) borate, and methylaluminoxane (MAO) in toluene. The solution has metallocene compound concentration of 2.0 milligrams per milliliter and a zirconium:borate:aluminum ratio of 1:1:500. The reaction was allowed to continue for 15 minutes while monomers were continuous fed to the reactor. The reaction produced 62.5 grams of polymer to yield 31,250 grams of polymer per gram of metallocene compound.

EXAMPLE 5

2.5 mL of 1.0 molar triisobutylaluminum (TIBA) in hexane was added to a stirred 3.0 liter reactor, containing 1800 mL of hexanes at 60 degrees Celsius, to serve as an impurities scavenger.

The reactor was charged with a 1:1 weight ratio of ethylene and propylene monomers to give an initial weight (pre-charge) of 20.3 grams of ethylene and 20.5 grams of propylene resulting in a reactor pressure of 50 psig. In other embodiments, the TIBA can be added after charging the reactor with the ethylene and propylene monomers.

Polymerization was initiated by introducing 1.5 mL of a toluene free catalyst solution consisting of a metallocene compound diphenylsilyl(cyclopentadienyl, 9-fluorenyl) zirconium dichloride, a boron compound tris(pentafluorophenyl) borane, and modified methylaluminoxane (MMAO) in isohexanes. The solution has a metallocene compound concentration of 2.0 milligrams per milliliters, and a zirconium:borate:aluminum ratio of 1:1:500. The reaction was allowed to proceed for 15 minutes while continuously feeding monomers. The reaction produced 99.5 grams of EP polymer to yield 33,181 grams of polymer per gram of metallocene compound.

EXAMPLE 6

2.5 mL of 1.0 molar triisobutylaluminum (TIBA), in hexane was added to a stirred 3.0 liter reactor, containing 1800 mL of hexanes at 57 degrees Celsius, to serve as an impurities scavenger.

The reactor was charged with a 1:1 weight ratio of ethylene and propylene monomers to give an initial weight (pre-charge) of 21.6 grams of ethylene and 21.6 grams of propylene resulting in a reactor pressure of 50 psig. In other embodiments, the TIBA can be added after charging the reactor with the ethylene and propylene monomers. The non-conjugated diene 5-ethylidene-2-norbornene (5.0 mL) was added to the reactor prior to initiation of polymerization.

Polymerization was initiated by introducing, 2.0 mL of a toluene free catalyst solution consisting of a metallocene compound diphenylsilyl(cyclopentadienyl, 9-fluorenyl) zirconium dichloride, a boron compound tris(pentafluorophenyl) borane, and modified methylaluminoxane (MMAO-C4) in isohexanes; the catalyst solution had a metallocene concentration of 2.0 milligrams per milliliter and a zirconium:borate:aluminum ratio of 1:1:500. The reaction produced 80.6 grams of polymer to yield 20,150 grams of polymer per gram of metallocene compound.

EXAMPLE 7

0.02 gram (0.039 mmole) of tris(pentafluorophenyl) borane and 10 mL of 1.5 molar (15 mmoles) of modified methylaluminoxane (MMAO) in isohexanes was combined to a 50 mL reaction flask, yielding a co-catalyst blend.

The mixture is stirred at room temperature, 25 degrees Celsius, for 10 minutes, yielding a near homogeneous solution.

A metallocene compound, ethylenebis(indenyl) zirconium dichloride 0.015 gram (0.0356 mmole) was added to the co-catalyst blend, forming a polymerization catalyst system having a zirconium:borate:aluminum ratio of 1:1:500.

The catalyst system, 1.5 mL (0.00225 gram of metallocene) was added to a stirred batch reactor containing hexane (1800 mL) and 2.5 mL of 1.0 Molar triisobutyl aluminum (in hexane) at 50 degrees Celsius and pressurized to 50 psig with a 1:1 mixture of ethylene and propylene, to yield ethylene/propylene elastomer copolymer.

EXAMPLE 8

2.5 mL of 1.0 molar triisobutylaluminum (TIBA) in hexane was added to a stirred 3.0 liter reactor, containing 1800 mL of hexanes at 57 degrees Celsius, to serve as an impurities scavenger.

The reactor was charged with a 1:1 weight ratio of ethylene and propylene monomers to give an initial weight (pre-charge) of 21.6 grams of ethylene and 21.6 grams of propylene resulting in a reactor pressure of 50 psig. In other embodiments, the TIBA can be added after charging the reactor with the ethylene and propylene monomers. The non-conjugated diene 5-ethylidene-2-norbornene (5.0 mL) was added to the reactor prior to initiation of polymerization.

Polymerization was initiated by introducing 2.7 mL (0.004 g of metallocene) of the toluene free catalyst solution prepared in Example 7. The reaction produced 56.3 grams of EPDM, a yield of 26,150 grams of polymer per gram of metallocene compound.

FIG. 1 shows a list of EP and EPDM polymers prepared with the use of this toluene-free catalyst. Examples 9 through 11 were prepared as described in Example 5, Examples 12 through 16 were prepared as described in Example 6, Examples 17 and 18 were prepared as described in Example 8 and the absence of diene, and Examples 19 and 20 as described in Example 8.

While these embodiments have been described with emphasis on the embodiments, it should be understood that within the scope of the appended claims, the embodiments might be practiced other than as specifically described herein.

What is claimed is:

1. A process for the polymerization or copolymerization of at least one alpha olefin, and optionally at least one diene monomer, to obtain an elastomer, the process consisting of:
   a. forming a catalytically effective homogenous solution of toluene free aliphatic hydrocarbon catalyst mixture by blending together:
      (i) a co-catalyst blend consisting of:
         (a) a modified methylaluminoxane (MMAO), alkylaluminum alkoxide, siloxalane, dimeric aluminoxane, or oligomeric aluminoxane in an aliphatic hydrocarbon; and
         (b) a boron component having the formula $M\text{-}R_3$, wherein the M is a boron, and R is an alkyl group, aryl group or combinations thereof, with each alkyl or aryl group possessing at least one electron-withdrawing substituent; and
      (ii) a metallocene pro-catalyst comprising a transition metal; and
   b. polymerizing the at least one alpha olefin in the presence of the catalytically effective homogenous solution of toluene free aliphatic hydrocarbon catalyst to form a polyolefin elastomer.

2. The process of claim 1, wherein the boron component is a perfluoroarylborane.

3. The process of claim 2, wherein the perfluoroarylborane is tris(penta fluorophenyl) borane.

4. The process of claim 1, wherein the metallocene pro-catalyst is selected from the group consisting of: zirconocene dichloride, dimethylbis(indenyl) zirconium, racemic-ethylenebis(indenyl) zirconium dichloride, dimethylsilyl bis(cyclopentadienyl) zirconium dichloride, dimethylsilyl(tetramethylcyclopentadienyl)(tert-butylamido) titanium dichloride, diphenylmethylene (cyclopentadienyl-9-fluorenyl)zirconium dichloride and diphenylsilyl (cyclopentadienyl-9-fluorenyl)zirconium dichloride.

5. The process of claim 1, wherein the alkylaluminum alkoxide is diisobutylaluminum-tert-butoxide.

6. The process of claim 1, wherein the siloxalane is diethylaluminum trimethylsiloxane.

7. The process of claim 1, wherein the dimeric aluminoxane is tetraisobutylaluminoxane.

8. The process of claim 1, wherein the oligomeric aluminoxane is methylaluminoxane or modified methylaluminoxane.

9. The process of claim 1, wherein a molar ratio of the first component of the co-catalyst blend to the transition metal is from 10 to 1,000.

10. The process of claim 1, wherein the molar ratio of the second component of the co-catalyst blend to the transition metal is from 0.2 to 10.

11. The process of claim 1, wherein the first component of the co-catalyst blend is combined with the second component of the co-catalyst.

12. The process of claim 11, wherein the metallocene pro-catalyst is combined with a reaction product of the combination of the first component of the co-catalyst and the second component of the co-catalyst blend.

13. The process of claim 1, wherein the co-catalyst blend further comprises a third component.

14. The process of claim 13, wherein the third component is a trialkylaluminum.

15. The process of claim 14, wherein the trialkylaluminum is selected from the group consisting of: trimethylaluminum, triethylaluminum, tri(n-propyl)aluminum, triisopropylaluminum, tri(n-butyl)aluminum, triisobutylaluminum tri(n-hexyl)aluminum and tri(n-octyl)aluminum.

16. The process of claim 13, wherein the molar ratio of the third component of the co-catalyst blend to the transition metal is from 0.1 to 1,000.

17. The process of claim 1, wherein the at least one alpha olefin contains from 2 carbon atoms to 20 carbon atoms and the diene, when present, is conjugated or nonconjugated, acyclic or cyclic, diene.

18. The process of claim 1, wherein the at least one alpha olefin is selected from the group consisting of: ethylene and propylene.

19. The process of claim 1, wherein the elastomer possesses an Mw from 70,000 to 2,000,000, an ML1+4 at 125 degrees Celsius from 10 to 200, an Mw/Mn from 1.5 to 10, and a Tg of below −25 degrees Celsius.

20. The process of claim 1, wherein the elastomer possesses an Mw from 250,000 to 1,750,000, an ML1+4 at 125 degrees Celsius from 15 to 150, an Mw/Mn from 2 to 7.5, and a Tg of below −25 degrees Celsius.

* * * * *